United States Patent
Kim (10) Patent No.: US 10,717,466 B2
(45) Date of Patent: Jul. 21, 2020

(54) RACK BAR SUPPORTING DEVICE OF STEERING APPARATUS FOR VEHICLE

(71) Applicant: MANDO CORPORATION, Gyeonggi-do (KR)

(72) Inventor: Heung Ju Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 198 days.

(21) Appl. No.: 15/881,676

(22) Filed: Jan. 26, 2018

(65) Prior Publication Data

US 2018/0222525 A1 Aug. 9, 2018

(30) Foreign Application Priority Data

Feb. 3, 2017 (KR) .......................... 10-2017-0015501

(51) Int. Cl.
*B62D 3/12* (2006.01)
*B62D 7/22* (2006.01)
*F16H 55/28* (2006.01)

(52) U.S. Cl.
CPC ............. *B62D 7/226* (2013.01); *B62D 3/123* (2013.01); *F16H 55/28* (2013.01)

(58) Field of Classification Search
CPC .......... B62D 7/226; B62D 3/12; B62D 3/123; F16H 35/00; F16H 1/04; F16H 55/28
See application file for complete search history.

(56) References Cited

U.S. PATENT DOCUMENTS

| 2003/0188917 | A1 | 10/2003 | Shimizu et al. | |
|---|---|---|---|---|
| 2009/0223314 | A1* | 9/2009 | Eickholt | B62D 3/123 74/422 |
| 2010/0024583 | A1* | 2/2010 | Kawakubo | B62D 3/123 74/422 |
| 2010/0122595 | A1* | 5/2010 | Sung | B62D 3/123 74/409 |

(Continued)

FOREIGN PATENT DOCUMENTS

| CN | 102826114 | 12/2012 |
|---|---|---|
| CN | 104520166 | 4/2015 |

(Continued)

OTHER PUBLICATIONS

Office Action dated Jul. 2, 2018 for Korean Patent Application No. 10-2017-0015501 and its English machine translation by Google translate.

(Continued)

*Primary Examiner* — James A English
(74) *Attorney, Agent, or Firm* — Ladas & Parry, LLP (57) ABSTRACT

The present disclosure provides a rack bar supporting device of a steering apparatus for a vehicle. The rack bar supporting device includes: a support yoke to support a rack bar; a first cam member configured to have a front surface supporting the support yoke toward the rack bar and to have a rear surface provided with a first cam surface inclined in a circumferential direction thereof; a second cam member configured to have a front surface provided with a second cam surface inclined in a circumferential direction thereof to correspond to the first cam surface, to have a rear surface to which one end of a torsion spring is supported and coupled; a yoke plug; and an elastic pin.

16 Claims, 12 Drawing Sheets

(56) References Cited

U.S. PATENT DOCUMENTS

| | | | |
|---|---|---|---|
| 2012/0266707 A1* | 10/2012 | Brochot | B62D 3/123 74/409 |
| 2013/0247696 A1* | 9/2013 | Imamura | F16H 55/283 74/30 |
| 2014/0007716 A1* | 1/2014 | Kometani | F16H 19/04 74/30 |
| 2014/0251035 A1* | 9/2014 | Ricker | F16H 57/12 74/30 |
| 2015/0020619 A1* | 1/2015 | Son | B62D 3/123 74/30 |

FOREIGN PATENT DOCUMENTS

| | | |
|---|---|---|
| JP | 2010-58689 | 3/2010 |
| JP | 5294007 | 9/2013 |
| JP | 2013-199239 | 10/2013 |
| KR | 10-2014-0020049 | 2/2014 |
| KR | 10-1602650 | 3/2016 |

OTHER PUBLICATIONS

Office Action dated Apr. 7, 2020 for Chinese Application No. 201810106791.4 and its English translation by Google Translate.

* cited by examiner

RACK BAR SUPPORTING DEVICE OF STEERING APPARATUS FOR VEHICLE

CROSS REFERENCE TO RELATED APPLICATION

This application claims priority from Korean Patent Application No. 10-2017-0015501, filed on Feb. 3, 2017, which is hereby incorporated by reference for all purposes as if fully set forth herein.

BACKGROUND OF THE INVENTION

1. Field of the Invention

The present disclosure relates to a rack bar supporting device of a steering apparatus for a vehicle. More particularly, in a rack bar supporting device of a rack-pinion type steering apparatus for a vehicle, the present disclosure relates to a rack bar supporting device of a steering apparatus for a vehicle which may prevent noise generated by an increase in the clearance due to abrasion of a support yoke or generated by the impact that is reversely input from the road surface to thereby provide a comfortable steering feeling to a driver while steering, and may shorten an assembling process and may prevent misassembly and loss of each component while each component is assembled into a vehicle.

2. Description of the Prior Art

Generally, a steering apparatus is an apparatus for changing the traveling direction of a vehicle according to the driver's will, and assists the driver in pointing the vehicle in the desired direction by discretionally changing the turning center of rotation of the front wheels of a vehicle.

However, such a conventional rack bar supporting device has problems in that it cannot support a rack bar properly because the clearance is increased due to abrasion of a support yoke and the rack bar, and that a rattling noise is generated in the support yoke and a yoke plug due to the increase in the clearance.

In addition, since components for supporting the rack bar need to be assembled one by one, there is a problem in that the assembly process is increased while the components are assembled into a vehicle, and the components are lost during misassembly or transportation of each component.

SUMMARY OF THE INVENTION

In this background, an aspect of the present disclosure is to provide a steering apparatus for a vehicle which may prevent noise generated by an increase in clearance due to abrasion of a support yoke or generated by the impact that is reversely input from the road surface, thereby providing a comfortable steering feeling to the driver while steering.

Another aspect of the present disclosure is to provide a steering apparatus for a vehicle which may shorten an assembling process and may prevent misassembly and loss of each component while each component is assembled into a vehicle.

Further, the aspects of the present embodiments are not limited thereto, and other aspects not mentioned can be clearly understood by those skilled in the art from the following description.

In accordance with an aspect of the present disclosure, there is provided a rack bar supporting device of a steering apparatus for a vehicle, including: a support yoke configured to be inserted into a cylinder of a gear box to support a rack bar; a first cam member configured to have a front surface supporting the support yoke toward the rack bar and to have a rear surface provided with a first cam surface inclined in a circumferential direction thereof; a second cam member configured to have a front surface provided with a second cam surface inclined in a circumferential direction thereof to correspond to the first cam surface, to have a rear surface to which one end of a torsion spring is supported and coupled, and to have an outer circumferential surface provided with an outer circumferential groove formed in an axial direction thereof; a yoke plug configured to have an inner front surface to which the other end of the torsion spring is supported and coupled to be coupled to the cylinder and to be provided with an insertion hole communicating with the outer circumferential groove; and an elastic pin configured to be inserted into the outer circumferential groove and the insertion hole so that the torsion spring is maintained in a compressed state.

As described above, according to embodiments of the present disclosure, it is possible to prevent noise generated by an increase in clearance due to abrasion of a support yoke or generated by the impact that is reversely input from the road surface, thereby providing a comfortable steering feeling to a driver while steering.

Further, according to embodiments of the present disclosure, it is possible to shorten an assembling process and may prevent misassembly and loss of each component while each component is assembled into a vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
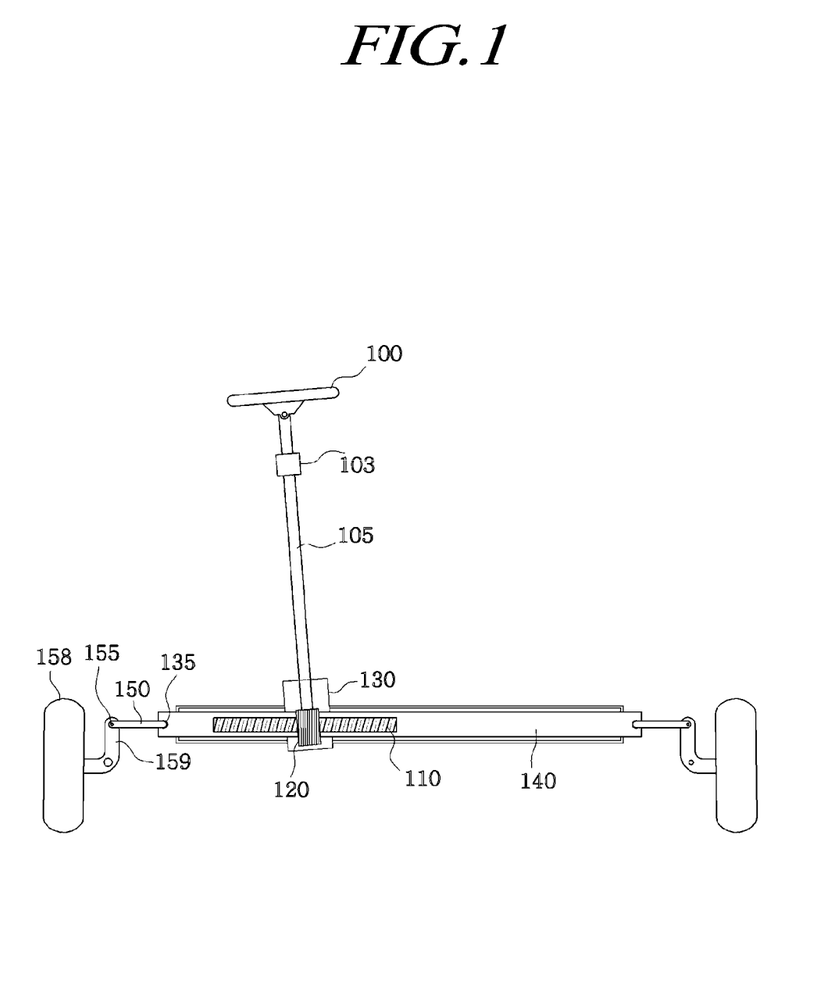
FIG. 1 is a schematic configuration diagram showing a rack-pinion type steering apparatus for a vehicle according to embodiments of the present disclosure.
Figure 2:
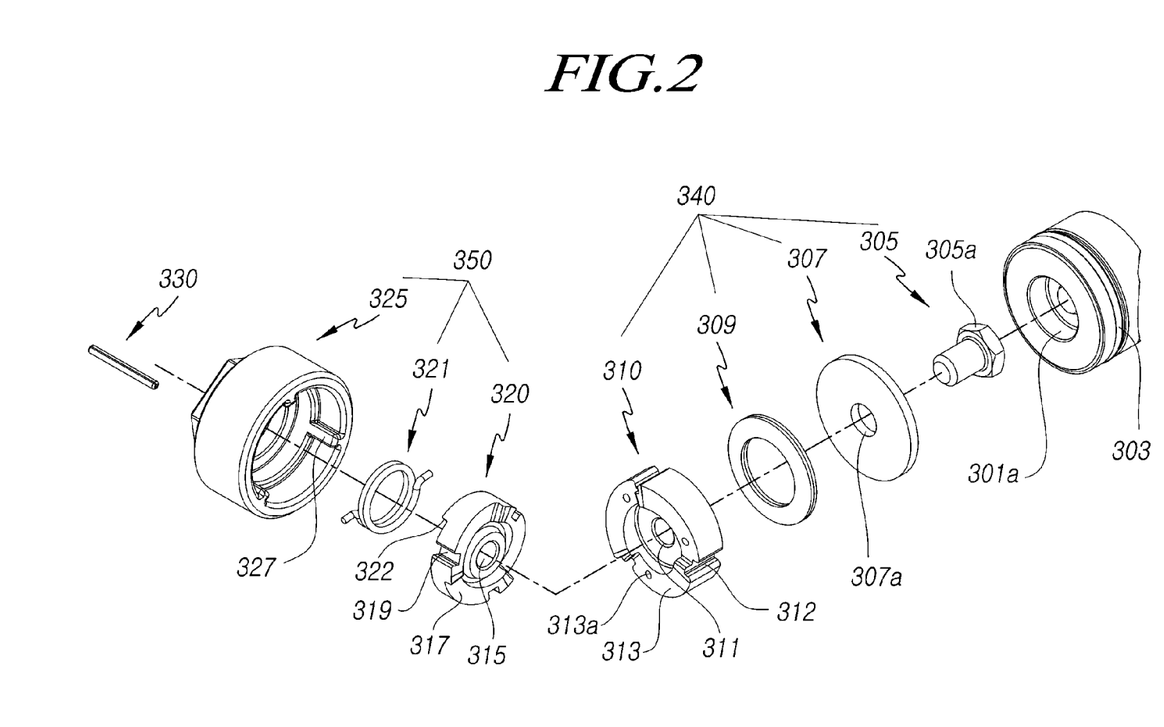
FIGS. 2 to 5 are exploded perspective views showing a part of a rack bar supporting device of a steering apparatus for a vehicle according to embodiments of the present disclosure.
Figure 3:
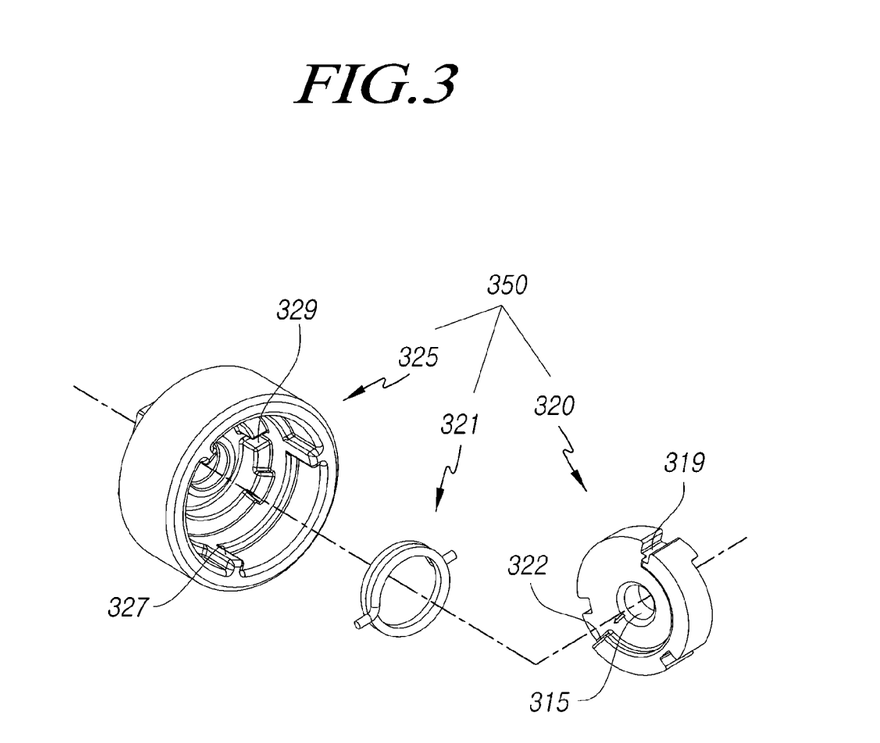
Figure 4:
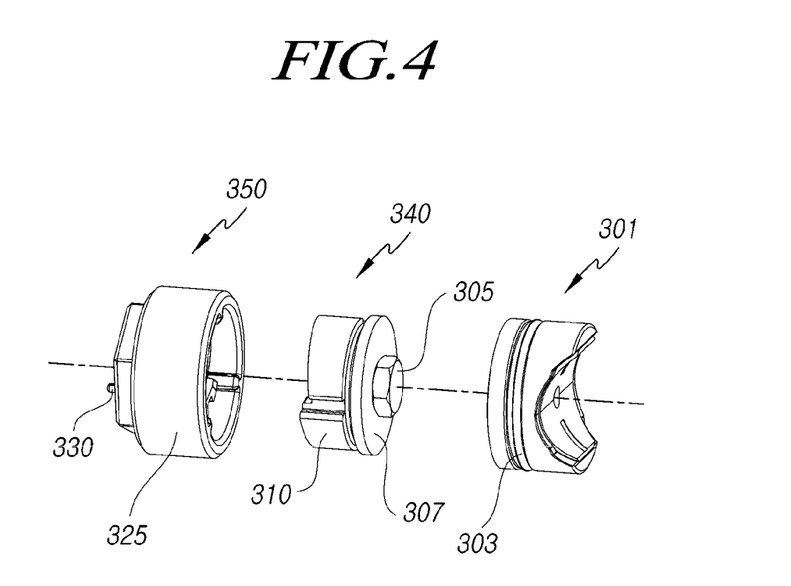
Figure 5:
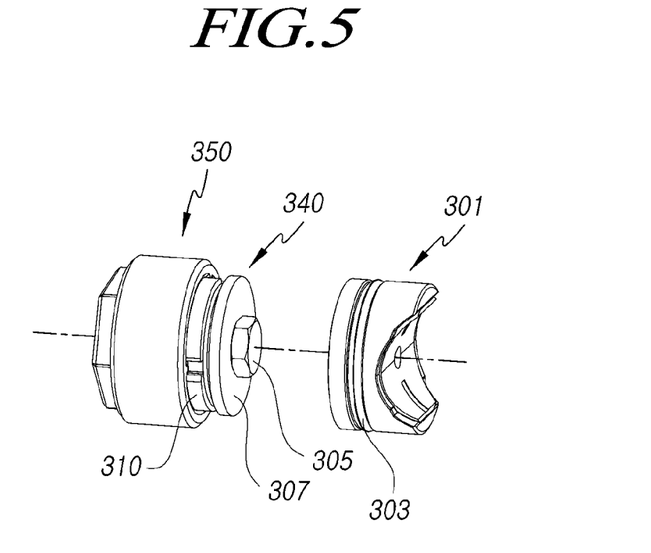
Figure 6:
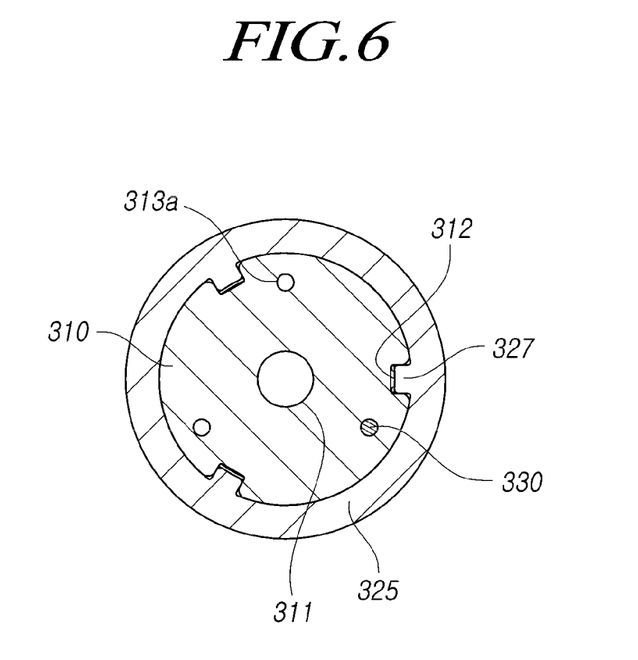
FIG. 6 is a cross-sectional view showing a part of a rack bar supporting device of a steering apparatus for a vehicle according to embodiments of the present disclosure.
Figure 7:
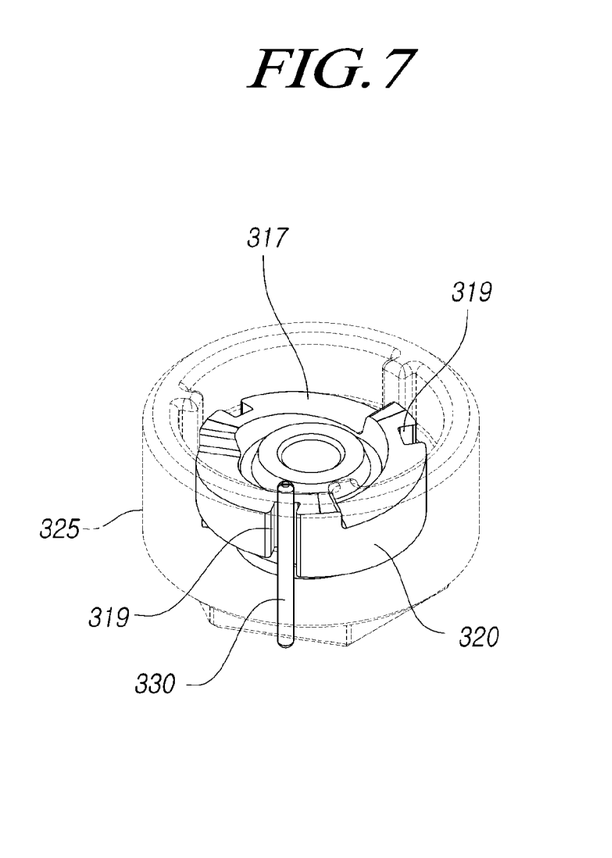
FIGS. 7 to 9 are perspective views showing a rack bar supporting device of a steering apparatus for a vehicle according to embodiments of the present disclosure.
Figure 8:
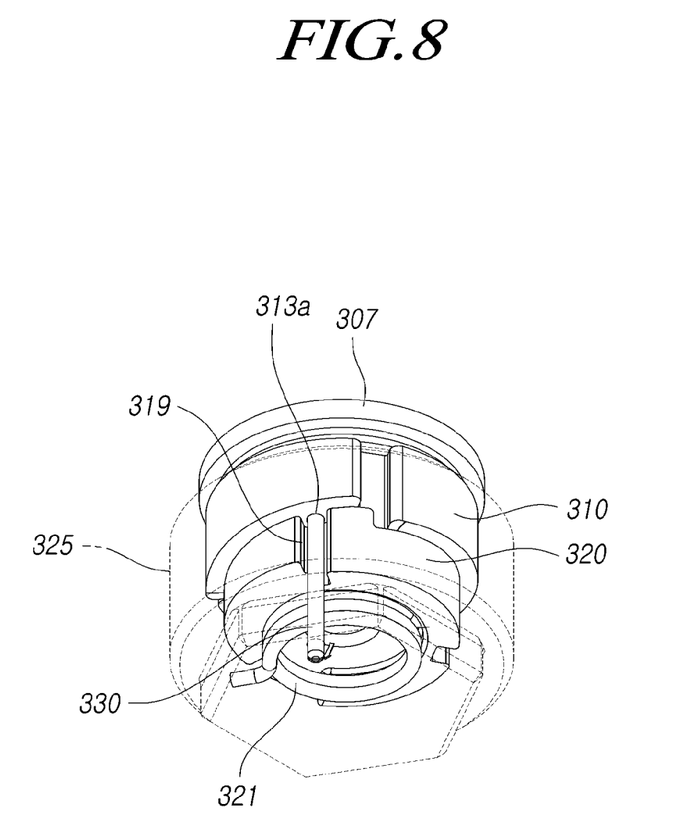
Figure 9:
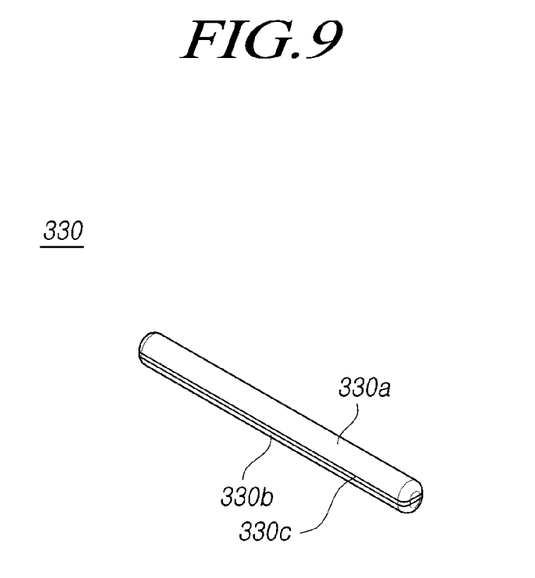
Figure 10:
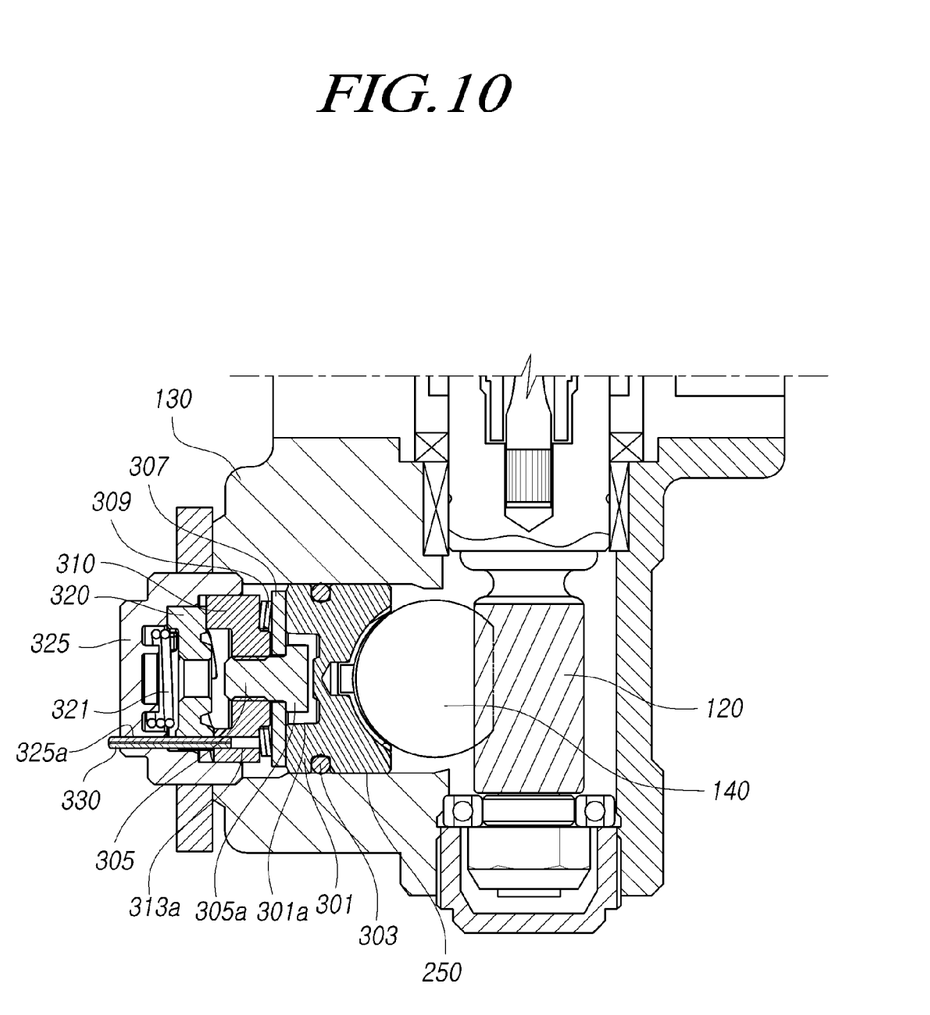
FIG. 10 is a cross-sectional view showing a rack bar supporting device of a steering apparatus for a vehicle according to embodiments of the present disclosure.
Figure 11:
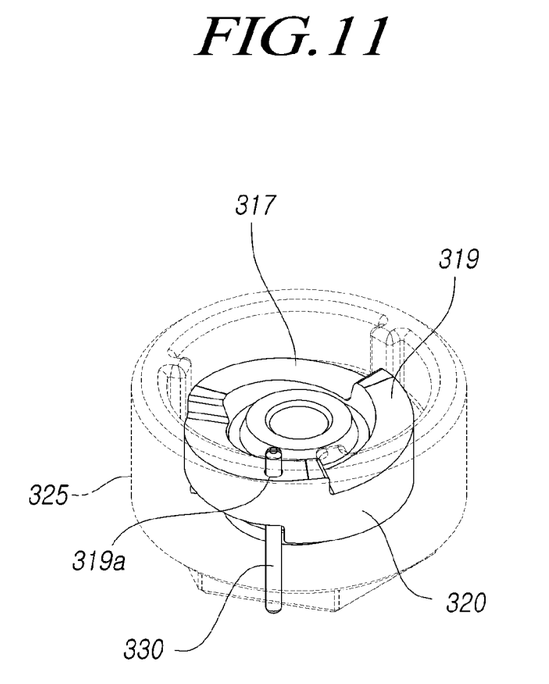
FIG. 11 is a perspective view showing a rack bar supporting device of a steering apparatus for a vehicle according to embodiments of the present disclosure.
Figure 12:
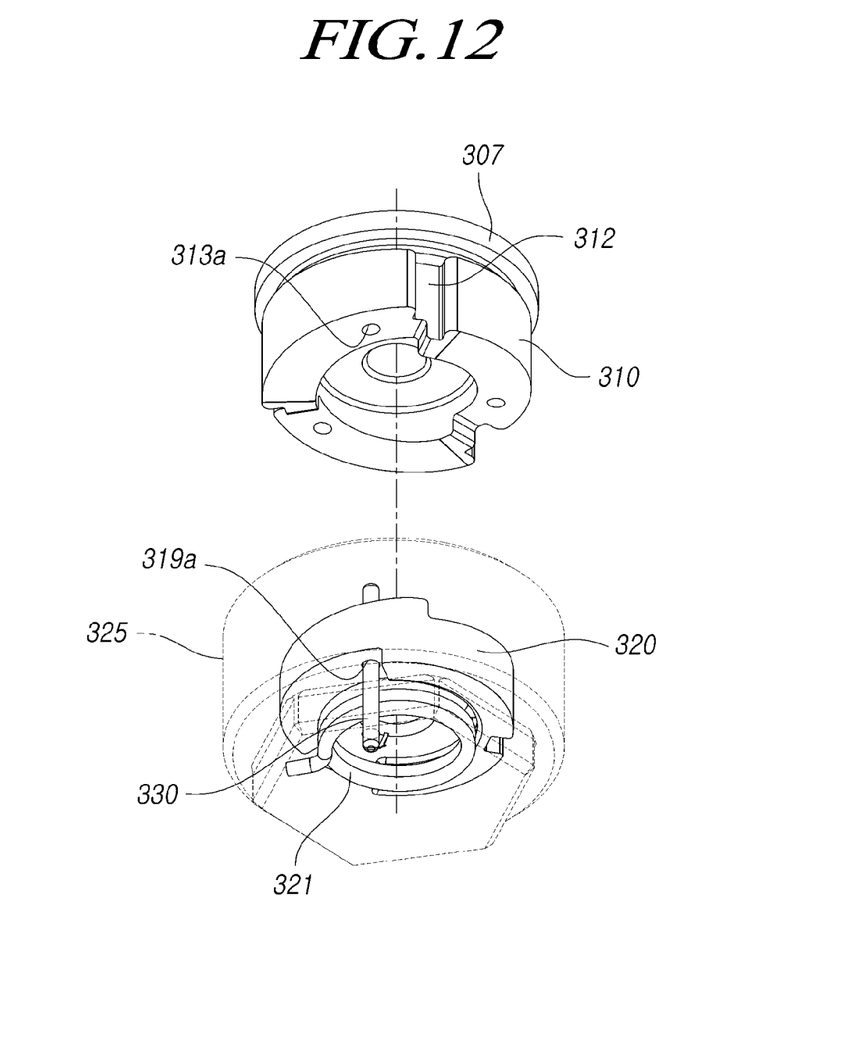
FIG. 12 is an exploded perspective view showing a rack bar supporting device of a steering apparatus for a vehicle according to embodiments of the present disclosure.

FIG. 1 is a schematic configuration diagram showing a rack-pinion type steering apparatus for a vehicle according to embodiments of the present disclosure, FIGS. 2 to 5 are exploded perspective views showing a part of a rack bar supporting device of a steering apparatus for a vehicle according to embodiments of the present disclosure, FIG. 6 is a cross-sectional view showing a part of a rack bar supporting device of a steering apparatus for a vehicle according to embodiments of the present disclosure, FIGS. 7 to 9 are perspective views showing a rack bar supporting device of a steering apparatus for a vehicle according to embodiments of the present disclosure, FIG. 10 is a cross-sectional view showing a rack bar supporting device of a steering apparatus for a vehicle according to embodiments of the present disclosure, FIG. 11 is a perspective view showing a rack bar supporting device of a steering apparatus for a vehicle according to embodiments of the present disclosure, and FIG. 12 is an exploded perspective view showing a rack bar supporting device of a steering apparatus for a vehicle according to embodiments of the present disclosure.

As shown in these drawings, a rack-pinion type steering apparatus for a vehicle according to embodiments of the present disclosure includes a steering wheel 100 disposed in front of a driver's seat, a steering shaft 105 connected to the steering wheel 100, a steering column 103 for allowing the steering shaft to be fixed to a vehicle body, a gear box 130 including a rack gear 110 and a pinion gear 120 for converting a rotational force received from the steering shaft 105 into a linear motion, a rack bar 140 having inner ball joints 135 at both ends thereof, and a tie rod 150 formed integrally with the balls of the inner ball joint 135.

The tie rod 150 is connected to an outer ball joint 155 and transmits a force to a knuckle 159 to steer a wheel 158.

In addition, a rack bar supporting device of the steering apparatus for a vehicle according to embodiments of the present disclosure includes a support yoke 301 configured to be inserted into a cylinder 250 of the gear box 130 to support the rack bar 140; a first cam member 310 configured to have a front surface supporting the support yoke 301 toward the rack bar 140 and to have a rear surface provided with a first cam surface 313 inclined in a circumferential direction thereof; a second cam member 320 configured to have a front surface provided with a second cam surface 317 inclined in a circumferential direction thereof to correspond to the first cam surface 313, to have a rear surface to which one end of a torsion spring 321 is supported and coupled, and to have an outer circumferential surface provided with an outer circumferential groove 319 formed in an axial direction thereof; a yoke plug 325 configured to have an inner front surface to which the other end of the torsion spring 321 is supported and coupled to be coupled to the cylinder 250 and to be provided with an insertion hole 325a communicating with the outer circumferential groove 319; and an elastic pin 330 configured to be inserted into the outer circumferential groove 319 and the insertion hole 325a so that the torsion spring 321 is maintained in a compressed state.

During operation of the steering apparatus for a vehicle, when a driver operates the steering wheel 100, the steering shaft 105 connected to the steering wheel 100 is rotated, and the pinion gear 120 connected to the lower end of the steering shaft drives the rack bar 140.

In the detailed description of the embodiments, for convenience of explanation, the direction of the rack bar 140, which is the front side of the support yoke 301, is designated as forward and the opposite direction is designated as rearward, unless otherwise specified.

Here, the rack bar 140 is engaged with the pinion gear 120 so as to convert a rotational motion of the steering shaft 105 into a rectilinear motion. On the rear surface of the rack bar 140, a rack bar supporting device for supporting the rack bar 140 in the direction of the pinion gear 120 is provided so that the rack bar 140 and the pinion gear 120 are properly engaged with each other.

The rack bar supporting device in the present embodiments largely includes the support yoke 301, the first cam member 310, the second cam member 320, the yoke plug 325, and the like. The first cam member 310 and the second cam member 320 respectively provided with the first cam surface 313 and the second cam surface 317 formed of inclined surfaces corresponding to each other support the support yoke 301 toward the rack bar 140 by the torsion spring 321.

The support yoke 301 is connected to the cylinder 250 of the gear box 130 while supporting the rear surface of the rack bar 140 via a yoke seat (not shown) provided on the front surface of the support yoke 301. The support yoke 301 has an outer circumferential surface to which an elastic ring 303 is coupled, thereby preventing impact transmitted through the rack bar 140 from the road surface and a rattling noise during vibration.

Here, the elastic ring 303 is required to be made of a material having predetermined bending, elasticity, and rigidity and capable of absorbing vibration and noise, and is therefore made of an elastic material having the above-mentioned properties, such as Natural Rubber (NR), Nitrile Butadiene Rubber (NBR), Chloroprene Rubber (CR), Ethylene Propylene Terpolymer (EPDM), Fluoro rubber (FPM), Styrene Butadiene Rubber (SBR), Chlorosulphonated Polyethylene (CSM), urethane, silicone, and the like.

The first cam member 310 that is disposed on the rear side of the support yoke 301 and inserted into the cylinder 250 of the gear box 130 is configured such that its front surface supports the support yoke 301 toward the rack bar 140 and its rear surface is provided with the first cam surface 313 inclined in the circumferential direction. The second cam member 320 provided on a rear side of the first cam member 310 includes the second cam surface 317 provided on a front surface thereof and inclined in the circumferential direction so as to correspond to the first cam surface 313 of the first cam member 310.

A first engagement portion 322 to which the one end of the torsion spring 321 is supported and coupled is provided on the rear surface of the second cam member 320, and the outer circumferential groove 319 formed in the axial direction is provided on the outer circumferential surface of the second cam member 320.

The yoke plug 325, to which the second cam member 320 is mounted, is provided with a second engagement portion 329 which is formed on an inner front surface thereof and to which the other end of the torsion spring 321 is supported and coupled, and the second engagement portion 329 is coupled to the cylinder 250 of the gear box 130.

In addition, the yoke plug 325 is provided with the insertion hole 325a communicating with the outer circumferential groove 319 of the second cam member 320, and the elastic pin 330 is coupled to the outer circumferential groove 319 of the second cam member 320 and the insertion hole 325a so that the torsion spring 321 is maintained in a compressed state.

A guide protrusion 327 formed in the axial direction is provided on an inner surface of the end of the yoke plug 325 and a guide groove 312 inserted into the guide protrusion 327 is provided on the outer circumferential surface of the first cam member 310. Accordingly, when the second cam member 320 is rotated by the torsion spring 321 to move the first cam member 310 forward, the first cam member 310 is moved while being supported by the guide protrusion 327. However, the present disclosure is not limited thereto. For example, the guide groove 312 may be formed in the yoke plug 325 and the guide protrusion 327 may be formed in the first cam member 310.

The second cam member 320, the torsion spring 321, and the yoke plug 325 are integrally coupled by the elastic pin 330 coupled to the outer circumferential groove 319 of the second cam member 320 and the insertion hole 325a of the yoke plug 325, to form a first module 350.

Accordingly, assembly and transportation can be performed in units of the first module 350 in which the torsion spring 321 is coupled to the second cam member 320 and the yoke plug 325, thereby shortening the assembling process and preventing misassembly or loss of each component.

In addition, on the front surface of the first cam member 310, an elastic member 309 for elastically supporting the support yoke 301 may be provided. The elastic member 309 may be formed in an annular shape tapered from an inner diameter portion thereof toward an outer diameter portion thereof and may be elastically deformed in the axial direction to provide an elastic force.

The elastic member 309 elastically supports the support yoke 301 while damping impact and vibration transmitted to the pinion gear and the rack bar 140 through the road surface. Here, the elastic member 309 is formed in an annular shape inclined in the axial direction from the inner diameter portion to the outer diameter portion to be elastically deformed in the axial direction that is a direction in which the support yoke 301 is supported. The elastic member 309 is made of a metal material such as steel because it is required to be made of a material having predetermined bending, elasticity, and rigidity and capable of absorbing vibration and noise.

In addition, the elastic member 309 may be made of engineering plastic material such as polyacetal (POM), polyamide (PA), polycarbonate (PC), polyimide (PI), polybutylene Terephthalate (PBT), or the like in order to dampen impact and vibration as well as the above-mentioned metal materials.

On the front surface of the elastic member 309, a supporting member 307 for supporting the elastic member 309 may be provided. Coupling holes 307a and 311 are respectively provided at central portions of the supporting member 307 and the first cam member 310 so that a coupling member 305 is coupled to the coupling holes 307a and 311. As a result, the first cam member 310, the elastic member 309, and the supporting member 307 are integrally coupled to each other to form a second module 340.

Accordingly, assembly and transportation can be performed in units of the second module 340 in which the elastic member 309 is coupled between the first cam member 310 and the supporting member 307, thereby shortening the assembling process and preventing misassembly or loss of each component.

An insertion groove 301a into which a head portion 305a of the coupling member 305 is inserted is provided on the rear surface of the support yoke 301, so that the elastic member 309 can elastically support the support yoke 301 through the supporting member 307 while maintaining the assembled state of the second module 340.

Meanwhile, the first cam member 310 may be provided with a communication hole 313a which communicates with the outer circumferential groove 319 of the second cam member 320 while passing through the front and rear surfaces thereof. The elastic pin 330 is coupled to the insertion hole 325a of the yoke plug 325, the outer circumferential groove 319 of the second cam member 320, and the communication hole 313a of the first cam member 310, so that the first module 350 and the second module 340 may be combined.

That is, assembly or transportation can be performed in units of the first module 350, the second module 340, and the support yoke 301. Alternatively, assembly or transportation can be performed in the state in which the first module 350 and the second module 340 are coupled to each other using the elastic pin 330.

Here, the elastic pin 330 is provided with an elastic damping member 330b between pin members 330a and 330c provided on both sides in the radial direction so as to be elastically deformable in the radial direction, so that, when the damping member 330b is inserted into the insertion hole 325a of the yoke plug 325 and the communication hole 313a of the first cam member 310, the damping member 330b is compressed and coupled in the radial direction.

Accordingly, it is possible to prevent the first module 350 and the second module 340 from being separated from each other and lost during transportation or assembly due to an elastic restoring force of the elastic pin 330. Thereby, when the first module 350 and the second module 340 are assembled with the cylinder 250 of the gear box 130 in a combined state, assembly is facilitated and the process is shortened.

Such an elastic pin 330 may be separated after the first module 350 and the second module 340 are assembled to the gear box 130 and then separated, or after the support yoke 301 is worn to some extent.

That is, when the clearance is increased due to the abrasion of the support yoke 301, the torsion spring 321 pushes the first cam member 310 toward the rack bar 140 to compensate for the clearance. Before the occurrence of the clearance due to durability progression, the elastic pin 330 may be held in a fixed state so that the torsion spring 321 is not loosened. Accordingly, an operator may remove the elastic pin 330 immediately after the assembly, or may remove the elastic pin 330 after the durability has progressed to some extent, to compensate for the clearance between the support yoke 301 and the rack bar 140.

Meanwhile, the yoke plug 325 is screwed to the cylinder 250 of the gear box 130 and is fixed while being prevented from being unscrewed by a lock nut (not shown) outside the gear box 130.

Such a rack bar supporting device constitutes the steering apparatus for a vehicle, together with the steering shaft, the pinion gear (see 120 in FIG. 2) connected to the steering shaft, the gear box 130 for accommodating the rack bar 140 provided with the rack gear engaged with the pinion gear, and the like.

In such present embodiments, as shown in FIGS. 11 and 12, a through-hole 319a may be formed in the second cam member 320 and the elastic pin 330 may be coupled to the through-hole 319a.

In this case, a rack bar supporting device of a steering apparatus for a vehicle according to embodiments of the present disclosure includes the support york 301 configured to be inserted into the cylinder 250 of the gear box 130 to support the rack bar 140; the first cam member 310 configured to have a front surface supporting the support yoke 301 toward the rack bar 140 and to have a rear surface provided with the first cam surface 313 inclined in a circumferential direction thereof; the second cam member 320 configured to have a front surface provided with the second cam surface 317 inclined in a circumferential direction thereof to correspond to the first cam surface 313, to have a rear surface to which one end of the torsion spring 321 is supported and coupled, and to have the through-hole 319a passing through the front surface and the rear surface; the yoke plug 325 configured to have an inner front surface to which the other end of the torsion spring 321 is supported and coupled to be coupled to the cylinder 250 and to be provided with the insertion hole 325a communicating with the outer circumferential groove 319; and the elastic pin 330 configured to be inserted into the through-hole 319a and the insertion hole 325a so that the torsion spring 321 is maintained in a compressed state.

Here, since the support yoke 301, the first cam member 310, the yoke plug 325, and the like are the same as those described above, detailed description thereof will be omitted. The second cam member 320 is provided with the through-hole 319a as shown in FIGS. 11 and 12, instead of the outer circumferential groove 319 shown in FIGS. 2 to 8, so that the elastic pin 330 may be coupled to the communication hole 313a of the first cam member 310 in a state of being coupled to the through-hole 319a, and the elastic pin 330 may be separated after the first module 350 and the second module 340 are assembled to the gear box 130.

According to the embodiments having such a structure and shape, it is possible to prevent noise generated by an increase in the clearance due to the abrasion of the support yoke or generated by the impact that is reversely input from the road surface, thereby providing a comfortable steering feeling to a driver while steering.

In addition, it is possible to shorten the assembling process and to prevent misassembly and loss of each component while each component is assembled into a vehicle.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments of the present disclosure are not intended to limit, but to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A rack bar supporting device of a steering apparatus for a vehicle, comprising:
   a support yoke configured to be inserted into a cylinder of a gear box to support a rack bar;
   a first cam member configured to have a front surface supporting the support yoke toward the rack bar and to have a rear surface provided with a first cam surface inclined in a circumferential direction thereof;
   a second cam member configured to have a front surface provided with a second cam surface inclined in a circumferential direction thereof to correspond to the first cam surface, to have a rear surface to which one end of a torsion spring is supported and coupled, and to have an outer circumferential surface provided with an outer circumferential groove formed in an axial direction thereof;
   a yoke plug configured to have an inner front surface to which the other end of the torsion spring is supported and coupled to be coupled to the cylinder and to be provided with an insertion hole communicating with the outer circumferential groove; and
   an elastic pin configured to be inserted into the outer circumferential groove and the insertion hole so that the torsion spring is maintained in a compressed state.

2. The rack bar supporting device of claim 1, wherein a first engagement portion to which the one end of the torsion spring is supported and coupled is provided on the rear surface of the second cam member, and a second engagement portion to which the other end of the torsion spring is supported and coupled is provided on the inner front surface of the yoke plug.

3. The rack bar supporting device of claim 1, wherein the second cam member, the torsion spring, and the yoke plug are integrally coupled by the elastic pin coupled to the outer circumferential groove and the insertion hole, to form a first module.

4. The rack bar supporting device of claim 3, wherein an elastic member for elastically supporting the support yoke is provided on the front surface of the first cam member.

5. The rack bar supporting device of claim 4, wherein the elastic member is formed in an annular shape tapered from an inner diameter portion thereof toward an outer diameter portion thereof, and is disposed on the front surface of the first cam member.

6. The rack bar supporting device of claim 5, wherein a supporting member for supporting the elastic member is provided on the front surface of the elastic member, and a coupling hole is provided at central portions of the supporting member and the first cam member so that the first cam member, the elastic member, and the supporting member are integrally coupled by a coupling member coupled to the coupling hole, to form a second module.

7. The rack bar supporting device of claim 6, wherein an insertion groove into which a head portion of the coupling member is inserted is provided on the rear surface of the support yoke.

8. The rack bar supporting device of claim 7, wherein the first cam member is provided with a communication hole which passes through the front surface and the rear surface and communicates with the outer circumferential groove, so that the elastic pin is coupled to the insertion hole, the outer circumferential groove, and the communication hole to combine the first module and the second module.

9. The rack bar supporting device of claim 1, wherein the elastic pin is provided with an elastic damping member between pin members provided on both sides in a radial direction thereof so as to be elastically deformable in the radial direction.

10. The rack bar supporting device of claim 1, wherein a guide protrusion formed in the axial direction is provided on an inner surface of an end of the yoke plug, and a guide groove inserted into the guide protrusion is provided on the outer circumferential surface of the first cam member.

11. A rack bar supporting device of a steering apparatus for a vehicle, comprising:
a support yoke configured to be inserted into a cylinder of a gear box to support a rack bar;
a first cam member configured to have a front surface supporting the support yoke toward the rack bar and to have a rear surface provided with a first cam surface inclined in a circumferential direction thereof;
a second cam member configured to have a front surface provided with a second cam surface inclined in a circumferential direction thereof to correspond to the first cam surface, to have a rear surface to which one end of a torsion spring is supported and coupled, and to have a through-hole passing through the front surface and the rear surface;
a yoke plug configured to have an inner front surface to which the other end of the torsion spring is supported and coupled to be coupled to the cylinder and to be provided with an insertion hole communicating with an outer circumferential groove; and
an elastic pin configured to be inserted into the through-hole and the insertion hole so that the torsion spring is maintained in a compressed state.

12. The rack bar supporting device of claim 11, wherein the elastic pin is provided with an elastic damping member between pin members provided on both sides in a radial direction thereof so as to be elastically deformable in the radial direction.

13. The rack bar supporting device of claim 1, wherein at least one end of the torsion spring extends in a radial direction which is perpendicular to the elastic pin.

14. The rack bar supporting device of claim 11, wherein at least one end of the torsion spring extends in a radial direction which is perpendicular to the elastic pin.

15. The rack bar supporting device of claim 1, wherein the rear surface of the second cam member has a stepped shape coupled to the one end of the torsion spring.

16. The rack bar supporting device of claim 11, wherein the rear surface of the second cam member has a stepped shape coupled to the one end of the torsion spring.

* * * * *